US012774737B2

(12) United States Patent
Wink et al.

(10) Patent No.: US 12,774,737 B2
(45) Date of Patent: Oct. 27, 2026

(54) MULTI MATERIAL GEAR ASSEMBLY

(71) Applicant: Eaton Intelligent Power Limited, Dublin (IE)

(72) Inventors: Carlos Henrique Wink, Granville, MI (US); Trishita Roy, Maharashtra (IN); Rahul Nigade, Pune (IN); Rahil Shaikh, Wagholi (IN); Subhraneel Biswas, Kolkata (IN); Cezar Gomes, Colina dos Pinheiros Valinhos (BR); Anderson Dascenzio, Sousas Campinas (BR); Sahil Chawla, Himachal Pradesh (IN); Eduardo Trejo Escalona, Kalamazoo, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/849,791

(22) PCT Filed: Mar. 24, 2023

(86) PCT No.: PCT/EP2023/025134
§ 371 (c)(1),
(2) Date: Sep. 23, 2024

(87) PCT Pub. No.: WO2023/179916
PCT Pub. Date: Sep. 28, 2023

(65) Prior Publication Data

US 2025/0215965 A1 Jul. 3, 2025

(30) Foreign Application Priority Data

Mar. 24, 2022 (IN) ............................ 202211016664

(51) Int. Cl.
*F16H 55/06* (2006.01)
*F16H 55/17* (2006.01)

(52) U.S. Cl.
CPC ............ *F16H 55/06* (2013.01); *F16H 55/17* (2013.01)

(58) Field of Classification Search
CPC ........................................................ F16H 55/06
See application file for complete search history.

(56) References Cited

U.S. PATENT DOCUMENTS

| | | | | |
|---|---|---|---|---|
| 1,908,187 A | 5/1933 | Ross | | |
| 2,051,498 A | 8/1936 | Short | | |
| 2,756,607 A | 7/1956 | Mochel et al. | | |
| 3,200,665 A * | 8/1965 | Wells | F16H 55/12 | 474/161 |

(Continued)

FOREIGN PATENT DOCUMENTS

| | | | |
|---|---|---|---|
| CN | 104923889 B | 10/2017 | |
| DE | 10127224 A1 * | 12/2002 | F16H 55/06 |

(Continued)

OTHER PUBLICATIONS

International Search Report and Written Opinion for Application No. PCT/EP2022/025422 mailed Jan. 30, 2023.

(Continued)

*Primary Examiner* — Terence Boes
(74) *Attorney, Agent, or Firm* — Merchant & Gould P.C.

(57) ABSTRACT

Examples of a multi-material gear assembly include a multi-material gear assembly including a ring gear including a first material, the ring gear having an inner diameter and an outer diameter, and a core coupled to the inside diameter of the ring gear, the core including a second material that is different from the first material. In an example of the above aspect, the first material of the ring gear includes stainless steel. In another example, the second material of the core includes one cast iron and an aluminum composite material. In a further example, the outer diameter of the ring gear includes a plurality of helical gear teeth. In yet another example, the inner diameter of the ring gear has a smooth surface compared to the outer diameter.

16 Claims, 14 Drawing Sheets

(56) References Cited

U.S. PATENT DOCUMENTS

| | | | | |
|---|---|---|---|---|
| 3,304,796 A * | 2/1967 | Leege | F16H 55/06 | |
| | | | 416/241 A | |
| 10,865,867 B2 | 12/2020 | Anand et al. | | |
| 2010/0201030 A1 * | 8/2010 | Oberle | F16H 55/06 | |
| | | | 264/262 | |

FOREIGN PATENT DOCUMENTS

| | | |
|---|---|---|
| EP | 3 800 374 A1 | 4/2021 |
| JP | S51-11049 B1 | 4/1976 |
| WO | 2013/122282 A1 | 8/2013 |
| WO | 2014/040927 A1 | 3/2014 |

OTHER PUBLICATIONS

International Search Report and Written Opinion for Application No. PCT/EP2023/025134 mailed Jun. 1, 2023.

Handschuh et al., "Vibration and Operational Characteristics of a Composit-Steel (Hybrid) Gear", Power Transmission Engineering, pp. 80-87, Dec. 2017 www.powertransmission.com.

Laberge et al., "Evaluation of a Variable Thickness Hybrid Composite Bull Gear", Presented at the AHS International 74th Annual Forum and Technology Display, Pheonix, Arizona, USA, May 14-17, 2018.

Li, Shuting, "Contact Stress and Root Stress Analyses of Thin-Rimmed Spur Gears with Inclined Webs", Journal of Mechanical Design, vol. 134/051001-1, May 2012.

Politis et al., "Review of receent developments in manufacturing lightweight multi-metal gears", Production Engineering (2021) 15:235-262, Jan. 6, 2021 https:/doi.org/10.1007/s11740-020-01011-5.

Souza et al., "Light-Weight Assembled Gears: A Green Design Solution for Passenger and Commercial Vehicles", Geartechnology, May 2013, www.geartechnology.com.

* cited by examiner

MULTI MATERIAL GEAR ASSEMBLY

CROSS-REFERENCE TO RELATED APPLICATION

This application is a National Stage Application of PCT/EP2023/025134, filed on Mar. 24, 2023, which claims priority to and the benefit of Indian Patent Application number 202211016664, filed on Mar. 24, 2022, titled "MULTI MATERIAL GEAR ASSEMBLY," the disclosures of which are incorporated herein by reference in their entireties. To the extent appropriate, a claim of priority is made to each of the above disclosed applications.

BACKGROUND

Gear assemblies are typically formed of the same material and have a web and rim based geometry. The ability of gear assemblies to provide acceptable noise, vibration, and harshness characteristics vary widely amongst the various types of available gear assemblies.

SUMMARY

In one aspect of the disclosure, a multi-material gear assembly includes a ring gear including a first material, the ring gear having an inner diameter and an outer diameter, a core coupled to the inside diameter of the ring gear, the core including a second material that is different from the first material, and a hub coupled to the core, the hub comprising a third material different from the second material, wherein a cross-section of the core comprises an upper planar portion, a lower planar portion, and a central portion, and is tapered from the upper planar portion and the lower planar portion towards the central portion. In an example of the above aspect, at least one of the first material and the second material includes stainless steel. In another example, the second material of the core includes one of cast iron and an aluminum composite material. In a further example, the outer diameter of the ring gear includes a plurality of gear teeth, for example helical gear teeth. In yet another example, the inner diameter of the ring gear has a smooth surface compared to the outer diameter. In another example, the core includes a central hub portion, a middle portion around the central hub portion, and an outer portion around the middle portion. In yet a further example, the hub portion is a monolithic hub portion. For example, the middle portion includes a plurality of holes formed therein.

In other examples of the above aspect, the outer portion of the core includes a mating surface configured to be coupled to the inner diameter of the ring gear. In an example, the central hub portion is detachable from the middle portion of the hub. In a further example, the outer portion of the hub has a predefined shape. For example, the predefined shape includes a plurality of alternating raised portions, and any two raised portions are coupled to each other via a sunken radius. In other examples, the plurality of alternating raised portions are formed at a circumference of the hub. In a further example, the outer portion of the hub further includes a raised locking portion at a circumference thereof. As another example, the middle portion of the core includes a plurality of complimentary shapes at an inner portion thereof, the complimentary shapes being in a mating configuration with the alternating raised portions of the outer portion of the hub.

In other examples of the above aspect, the third material is similar to the first material. In an example, the cross-section of the core has an angled cross shape. In another example, a thickness of the upper planar portion is equal to about 3.5 mm. In a further example, a width of at least one of the upper planar portion and the lower planar portion is in a range of about 5.3-19.05 mm. In yet another example, a width of the central portion is in a range of about 5.3-19.05 mm. In other example, a thickness of the lower planar portion is equal to about 7.5 mm. In a further example, a fillet radius of the central portion of the core is equal to about 5 mm. In yet another example, a surface roughness of one of the upper planar portion and the lower planar portion is in a range of about 20-25 mm. In a further example, a material strength factor of the core is in a range of about 0.9-1.1 mm.

Other aspects of the present disclosure include a method for producing a gear, the method including forming a ring gear comprising an annular flange defining a central aperture and having a plurality of outwardly facing teeth, the annular flange being formed from a first material, forming a core structure defining a central aperture and being formed from a second material different from the first material, forming a hub in the central aperture of the core structure, the hub being formed from a third material different from the second material, and inserting the core structure into the central aperture of the annular flange to form a multi-material gear assembly. In examples, forming the core structure includes forming the core structure with a cross-section having an upper planar portion, a lower planar portion, and a central portion, the cross-section being tapered from the upper planar portion and the lower planar portion towards the central portion.

In some examples, a multi-material gear assembly includes a ring gear comprising a first material, the ring gear having an inner diameter and an outer diameter defining a plurality of gear teeth; a core coupled to the inside diameter of the ring gear, the core comprising a second material that is different from the first material; and a hub coupled to the core, the hub comprising a third material different from the second material; wherein a cross-section of the core comprises an upper planar portion, a lower planar portion, and a central portion, and is tapered from the upper planar portion and the lower planar portion towards the central portion. In some examples, at least one of the first material and the third material comprises stainless steel. In some examples, the second material of the integrated hub and core comprises one of cast iron and an aluminum composite material. In some examples, the aluminum composite material comprises Al 6061-SiC. In some examples, the outer diameter of the ring gear comprises a plurality of helical gear teeth. In some examples, the inner diameter of the ring gear has a smooth surface compared to the outer diameter. In some examples, the core comprises a middle portion around the hub, and an outer portion around the middle portion. In some examples, the hub is one of press-fit into the core, and over-molded with the core. In some examples, the hub is detachable from the middle portion of the core. In some examples, the middle portion of the core comprises a plurality of holes formed therein. In some examples, the outer portion of the core comprises a mating surface configured to be coupled to the inner diameter of the ring gear. In some examples, an outer circumference of the hub has a predefined shape. In some examples, the predefined shape comprises a plurality of alternating raised portions; and any two raised portions are coupled to each other via a sunken radius. In some examples, the plurality of alternating raised portions are formed at a circumference of the hub. In some examples, the outer portion of the hub further comprises a raised locking portion at a circumference thereof. In some examples, the middle portion of the core comprises a plurality of complimentary shapes at an inner portion thereof, the complimentary shapes being in a mating configuration with the alternating raised portions of the outer portion of the hub. In some examples, the third material is similar to the first material. In some examples, the cross-section of the core has an angled cross shape. In some examples, a thickness of the upper planar portion is equal to about 3.5 mm. In some examples, a width of at least one of the upper planar portion and the lower planar portion is in a range of about 5.3-19.05 mm. In some examples, a width of the central portion is in a range of about 5.3-19.05 mm. In some examples, a thickness of the lower planar portion is equal to about 7.5 mm. In some examples, a fillet radius of the central portion of the core is equal to about 5 mm. In some examples, a surface roughness of one of the upper planar portion and the lower planar portion is in a range of about 20-25 mm. In some examples, a material strength factor of the core is in a range of about 0.9-1.1 mm.

In one example, a method for producing a gear, includes: forming a ring gear comprising an annular flange defining a first central aperture and having a plurality of outwardly-facing teeth, the ring gear being formed from a first material; forming a core structure, the core structure defining a second central aperture for receiving a shaft or hub and being formed from a second material different from the first material, the core structure defining an outer portion, an inner portion, and a central web portion extending between the inner and outer portions, wherein the central web portion, in cross-section, has a first width proximate the inner portion, a second width proximate a midpoint of the central web portion, and a third width proximate the outer portion, wherein at least one of the first, second, and third thicknesses are unequal; and press-fitting the ring gear onto the core structure such that the core structure is received into the first central aperture. In some examples, the step of forming the core structure includes over-molding the core structure onto the hub structure. In some examples, the step of forming the hub structure includes forming the hub structure from a third material different from the second material. In some examples, the third material is different from the first material. In some examples, the third material is the same as the first material. In some examples, the method includes welding the core structure and ring gear together. In some examples, at least one of the first material and the third material is a steel material and the second material is one or more of a cast-iron material and an aluminum-based material. In some examples, the cross-section of the core structure has an angled cross shape. In some examples, a thickness of the outer portion is equal to about 3.5 mm. In some examples, a width of at least one of the outer portion and the inner portion is in a range of about 5.3-19.05 mm. In some examples, a width of the central web portion is in a range of about 5.3-19.05 mm. In some examples, a thickness of the inner portion is equal to about 7.5 mm. In some examples, a fillet radius of the central web portion of the core is equal to about 5 mm. In some examples, a surface roughness of one of the outer portion and the inner portion is in a range of about 20-25 mm. In some examples, a material strength factor of the core is in a range of about 0.9-1.1 mm. In some examples, the annular flange is over-molded onto the core structure.

A multi-material gear assembly can include a ring gear comprising a first material, the ring gear having an inner diameter defining a first aperture and an outer diameter defining a plurality of gear teeth; a core defining an outer portion, an inner portion, and a central web portion extending between the inner and outer portions, wherein the core is secured within the first aperture of the ring gear, the core comprising a second material that is different from the first material, the core defining a central aperture for receiving a shaft or a hub; and wherein the central web portion, in cross-section, has a first width proximate the inner portion, a second width proximate a midpoint of the central web portion, and a third width proximate the outer portion, wherein at least one of the first, second, and third thicknesses are unequal. In some examples, the ring gear and the core define a press-fit connection. In some examples, the first width is equal to or greater than the second width. In some examples, the third width is greater than the second width. In some examples, the third width is equal to the second width.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Conventional gear assemblies are typically formed of the same material and have a web and rim based geometry. These gear assemblies typically have certain deficiencies. In particular, conventional gear assemblies are heavy and have suboptimal noise, vibration, and harshness ("NVH") characteristics. Examples of the gear assembly as described in examples of the present disclosure address and overcome these deficiencies. In particular, an example of the gear assembly as described in the present disclosure is light weight and maintains connection of the various components in a rotational and thrust load direction. Additionally, various finishing operations such as internal diameter grinding, hard finishing of tooth flanks, and so forth, are performed after the gear assembly is assembled.

Examples of the disclosure include a novel gear assembly that uses materials having a high damping coefficient for the core of the gear for noise attenuation, while keeping the toothed annular flange made of steel for a higher power density. In examples, the gear core may be a single piece of a web and a hub, which is assembled to the steel toothed annular flange. The gear core may be made of or include materials that provide weight savings, the materials include, e.g., cast iron and/or aluminum alloy or composite.

Other examples of the disclosure address two important challenges of electric vehicle (EV) gearboxes, which are noise and weight reduction. For example, a gear assembly may include a steel toothed annular flange and a one-piece web and hub formed from a material other than the material of the toothed annular flange material. For example, the material of the gear assembly may be or include, e.g., cast iron and/or aluminum alloy or composite. Examples of such materials include Aluminum metal matrix composites (MMC) such as, e.g., Al 6061-SiC).

Figure 1:
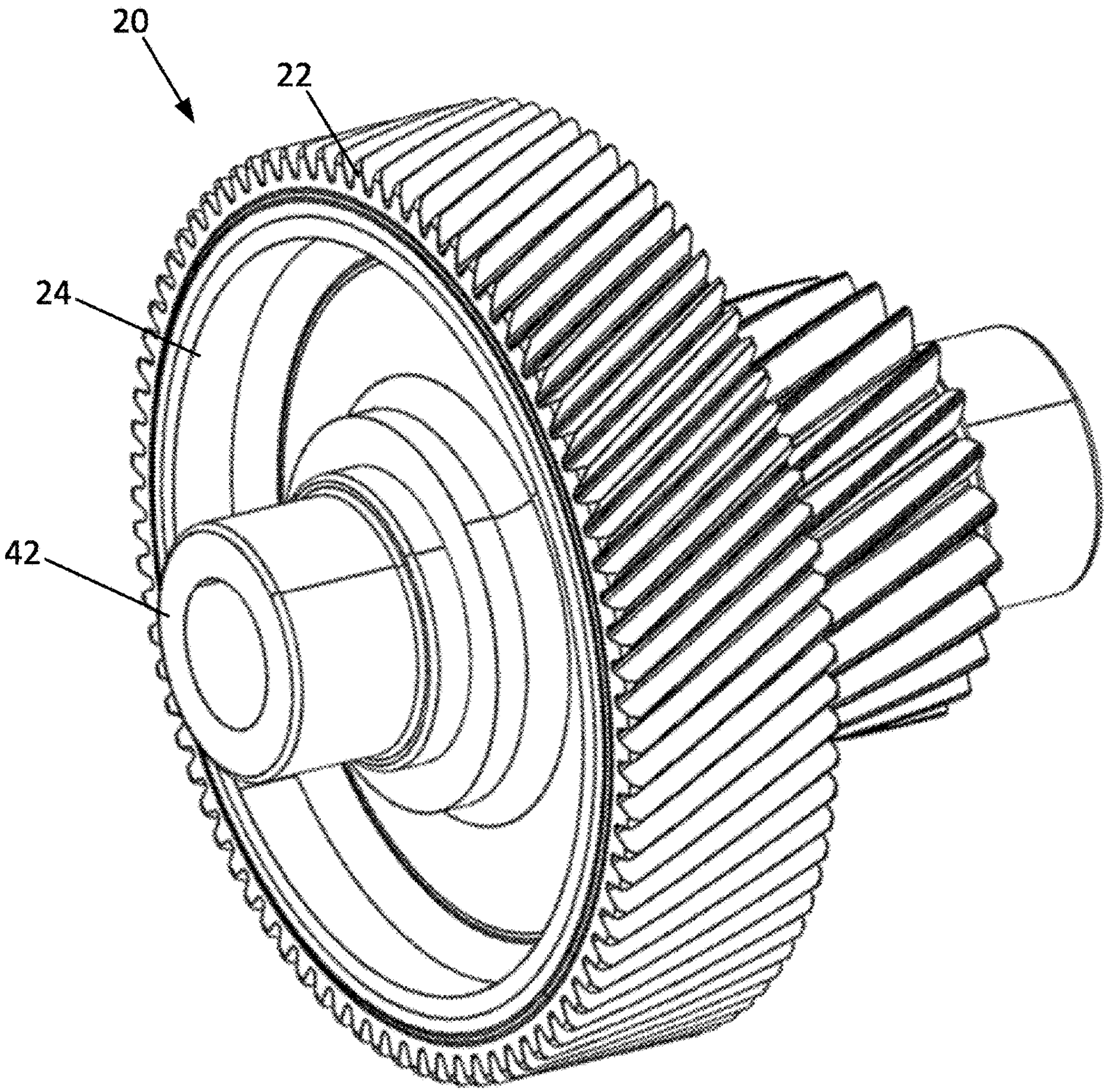
FIG. 1 is a perspective view of a multi-metal gear assembly, according to various examples of the present disclosure.
Figure 2:
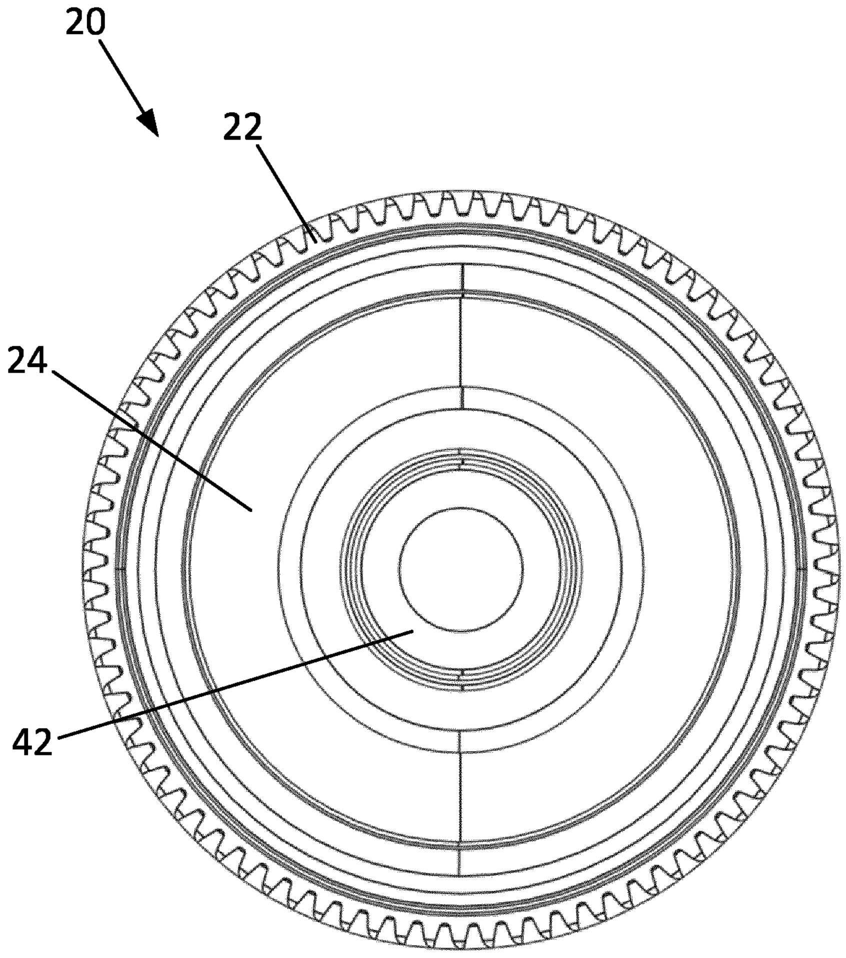
FIG. 2 is a cross-section along a front portion of the multi-metal gear assembly of FIG. 1.
Figure 3:
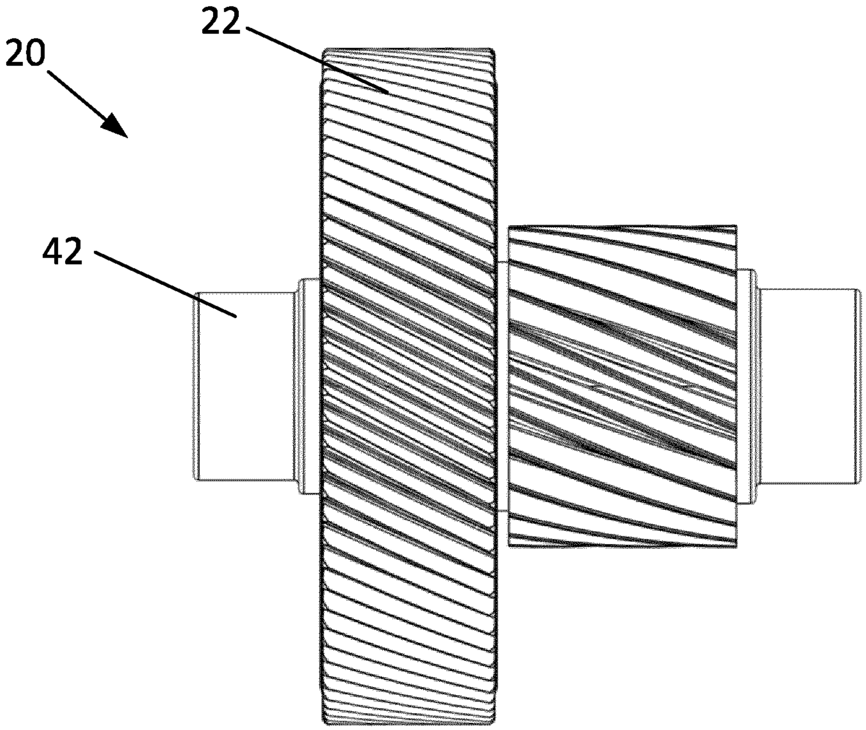
FIG. 3 is a side view of the multi-metal gear assembly of FIG. 1.
Figure 4:
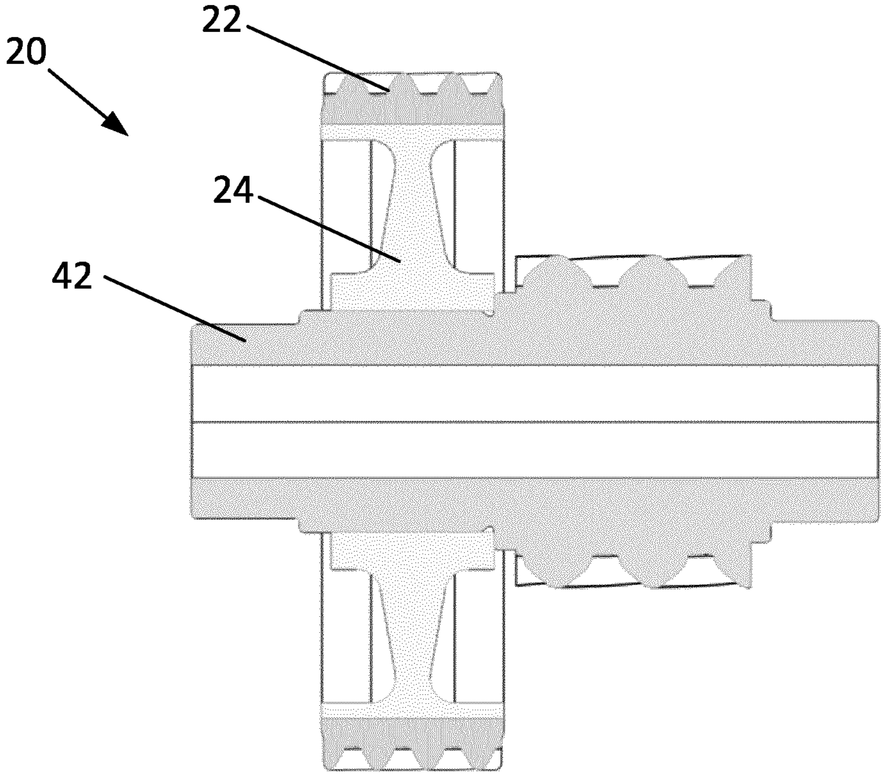
FIG. 4 is a cross-section along a side portion the multi-metal gear assembly of FIG. 1.

FIG. 1 is a perspective view of a multi-metal gear assembly, according to various examples of the present disclosure. FIG. 2 is a cross-section along a front portion the multi-metal gear assembly of FIG. 1, according to various examples of the present disclosure. FIG. 3 is a side view of the multi-metal gear assembly of FIG. 1, according to various examples of the present disclosure. FIG. 4 is a cross-section along a side portion the multi-metal gear assembly of FIG. 1, according to various examples of the present disclosure. FIGS. 1-4 illustrate a gear assembly that addresses and overcomes the deficiencies of conventional gear assemblies, according to one or more examples described and illustrated herein. In particular, the gear assembly 20 of the present disclosure may include a ring gear 22 and a web or core 24. In various examples, the gear assembly 20 may be formed by various processes and methods to join the ring gear 22 and the web 24 together, as will be discussed in more detail below. In examples, different materials may be utilized to form each of the ring gear 22 and the web 24, as each of these components may have varying strength requirements or strength profiles. As such, some components may be formed of materials that are more cost effective or lighter than the materials used to form other components. As a result, the overall cost of the gear assembly 20 may be lowered. Further, the materials may exhibit improved NVH characteristics, as is discussed in more detail below. In examples, the gear assembly 20 may have a gear or shaft 42 mounted therein. Further description of the gear or shaft 42 is provided below with respect to the description of FIG. 7.

Figure 5:
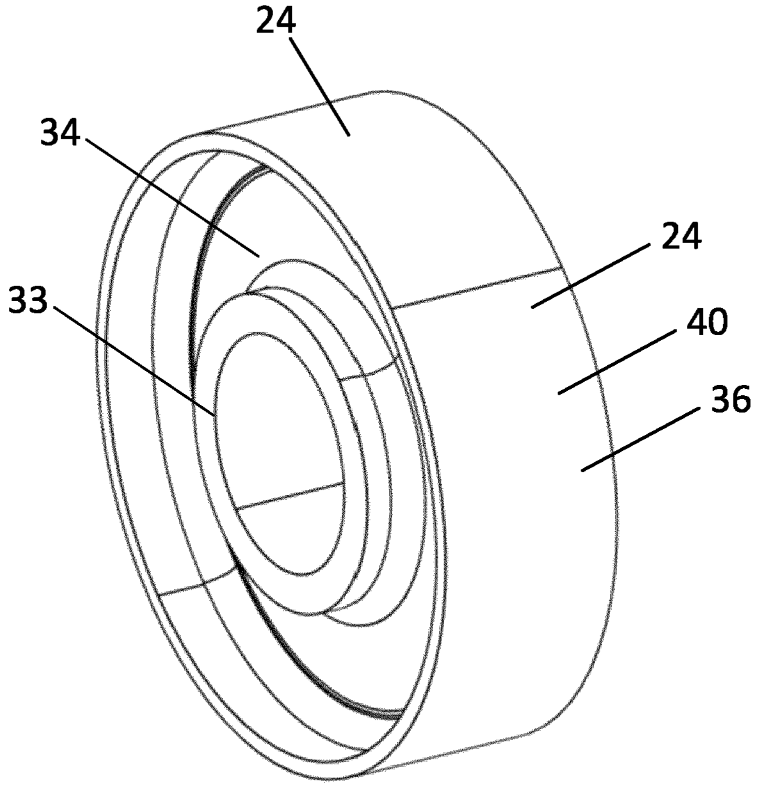
FIG. 5 is a perspective view of a web or core of a multi-metal gear assembly, according to various examples of the present disclosure.

FIG. 5 is a perspective view of a web or core of a multi-metal gear assembly, according to various examples of the present disclosure. FIG. 5 illustrates the core or web 24 that may be formed of a material other than the material of the ring gear 22. For example, the web 24 may include a one-piece shape that has a monolithic hub portion 33 formed thereon, and the web 24 may extend from the hub portion 33 radially to a middle portion 34 that connects the hub portion 33 and an outer portion 36. In examples, the outer portion 36 includes a mating surface 40 that is configured to be coupled to the inner diameter 28 of the ring gear 22 illustrated in FIGS. 1-4.

In various examples of the disclosure, the web 34 may be formed of cast iron. The cast iron may include, e.g., Austempered Ductile Iron, which is a form of cast iron that enjoys high strength and ductility as a result of its microstructure controlled through heat treatment. Other forms of cast iron may also be utilized. The cast iron web 24 may provide a lower cost material in comparison to steel. The thermal coefficient of expansion for cast iron is close to that of steel, and cast iron material provides an improved damping capability in comparison to stainless steel and has a lower density compared to steel, which may result in a weight savings for the gear assembly. In addition, cast iron material may be cast to include various geometries.

In examples of the disclosure, the web 24 may be formed of or include an aluminum composite material, which may include Aluminum MMC such as Al6061-SiC. The thermal coefficient of expansion for Aluminum MMC is close to that of steel. The Aluminum MMC material provides an improved damping capability in comparison to steel and has a lower density compared to steel resulting in a weight savings of the gear assembly. In addition, Aluminum MMC material has a higher yield strength in comparison to conventional aluminum alloys. In various examples, the ring gear 22 may be assembled to the web 24 using various processes. For example, the web 24 may be splined with the ring gear 22. In a further example, the web 24 may be welded to the ring gear 22. In yet another example, the web 24 may be over-molded with the ring gear 22. In a further example, the web 24 and ring gear 22 may be press-fit together.

Figure 6:
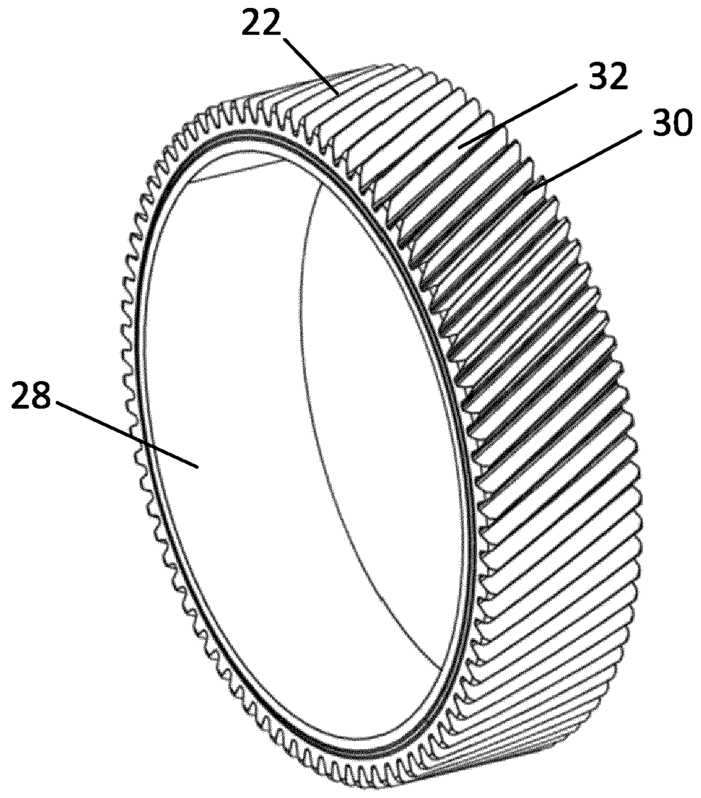
FIG. 6 is a perspective view of an annular ring gear of a multi-metal gear assembly, according to various examples of the present disclosure.

FIG. 6 is a perspective view of an annular ring gear of a multi-metal gear assembly, according to various examples of the present disclosure. FIG. 6 illustrates ring gear 22 which may be formed of or include stainless steel or alloyed steel such as, e.g., 1045, 4140, 20MnCr5, or 8620 steel, which is a low carbon nickel chromium molybdenum alloy steel. In examples, the ring gear 22 includes an inner diameter 28 separated from an outer diameter 30. The outer diameter 30 includes gear teeth 32 formed thereon. In the example shown, the gear teeth are helical. Other types of gear teeth arrangements are possible. For example, the gear teeth 32 can be configured to define a spur gear (i.e., straight teeth parallel to axis of rotation), a bevel gear, a miter gear, and other types of gears. In examples, the inner diameter 28 may have a smooth surface.

Figure 7:
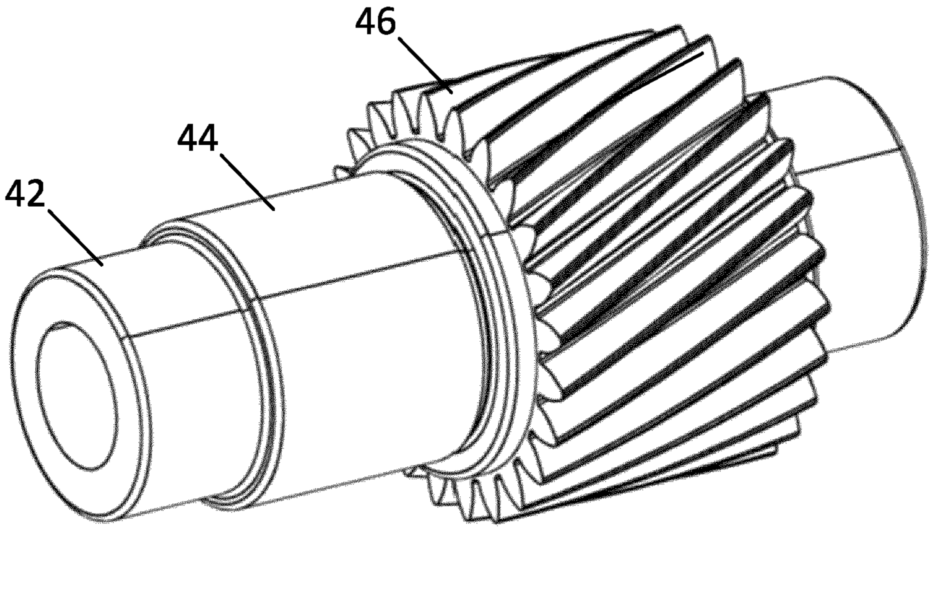
FIG. 7 is a perspective view of a shaft and gear, according to various examples of the present disclosure.

FIG. 7 is a perspective view of a shaft or gear, according to various examples of the present disclosure. The shaft 42 may be coupled, e.g., integrally coupled, to a gear 46 via an intermediate coupling body 44. In operation, the shaft 42 may be inserted in, or mounted to, a gear assembly such as, e.g., the gear assembly 20 illustrated in FIG. 1.

Figure 8:
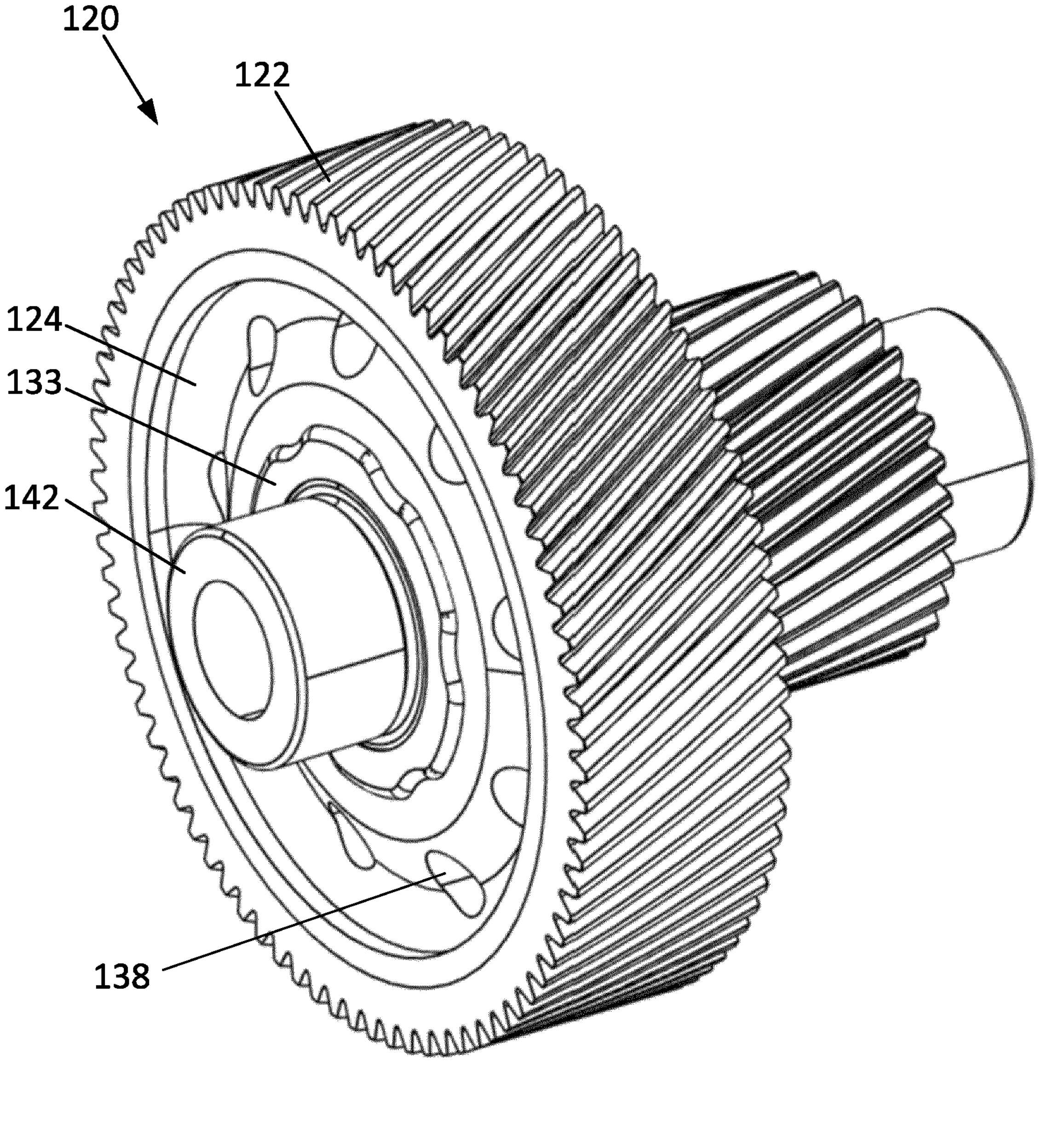
FIG. 8 is a perspective view of a multi-metal gear assembly, according to various examples of the present disclosure.
Figure 9:
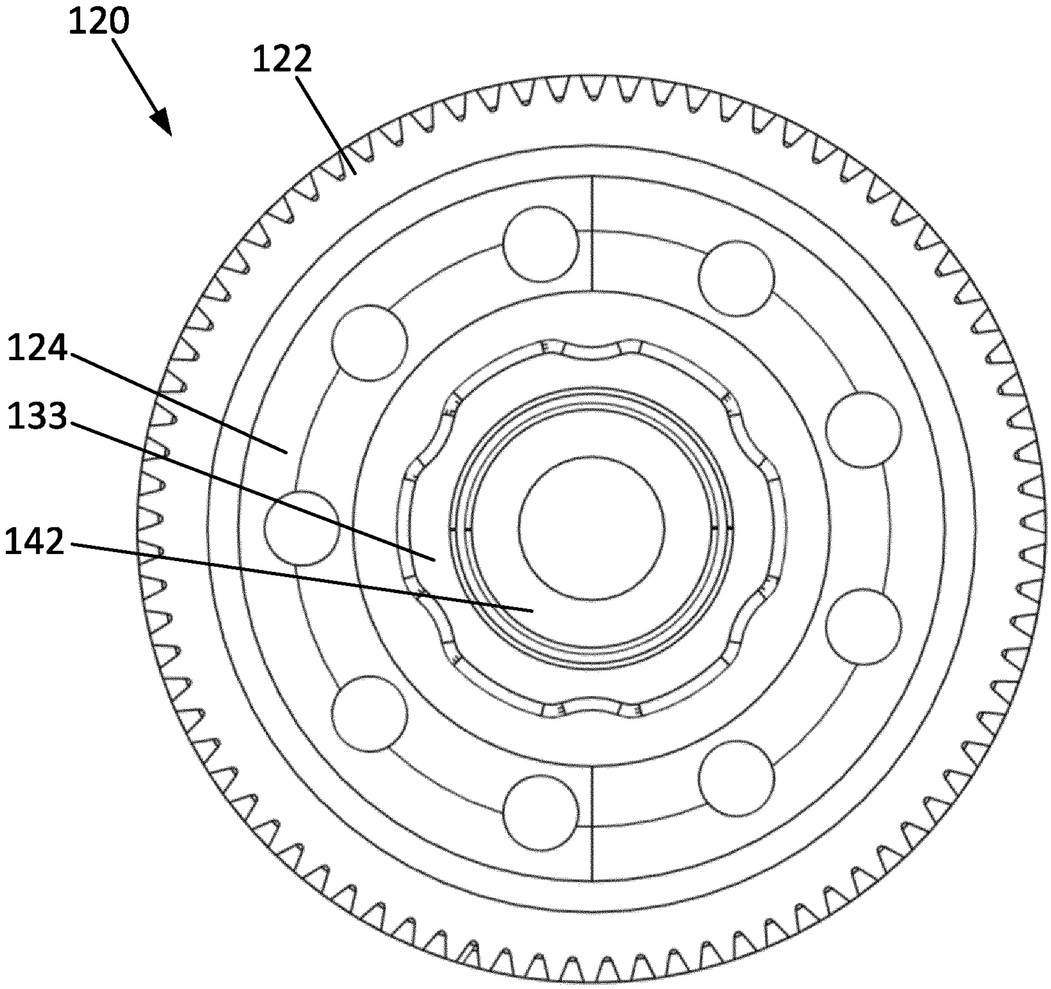
FIG. 9 is a cross-section view of the multi-metal gear assembly of FIG. 8.
Figure 10:
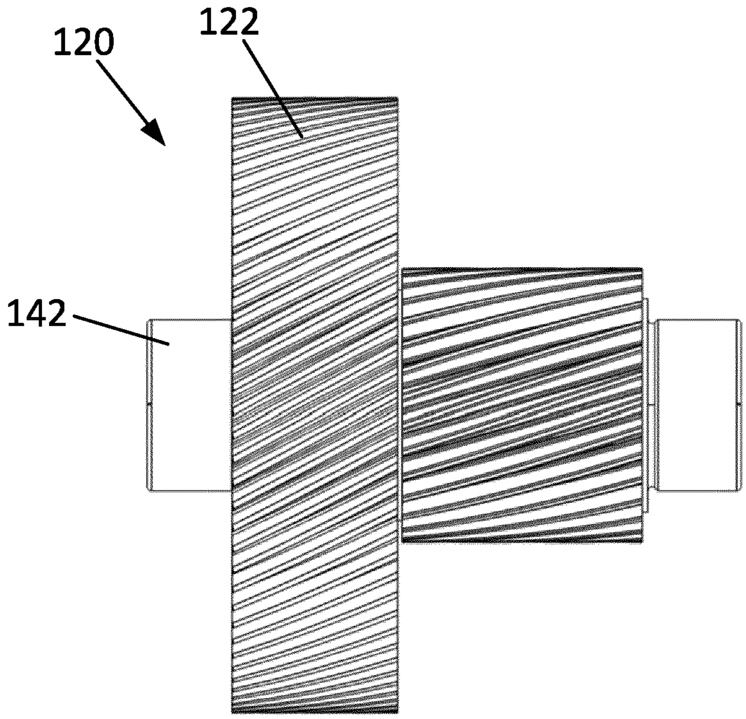
FIG. 10 is a side view of the multi-metal gear assembly of FIG. 8.
Figure 11:
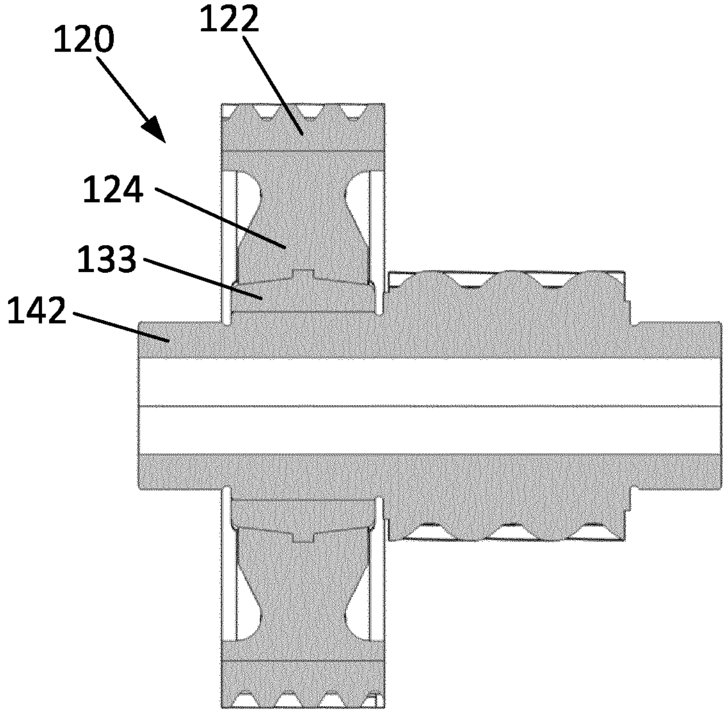
FIG. 11 is a cross-section of a side of the multi-metal gear assembly of FIG. 8.
Figure 12:
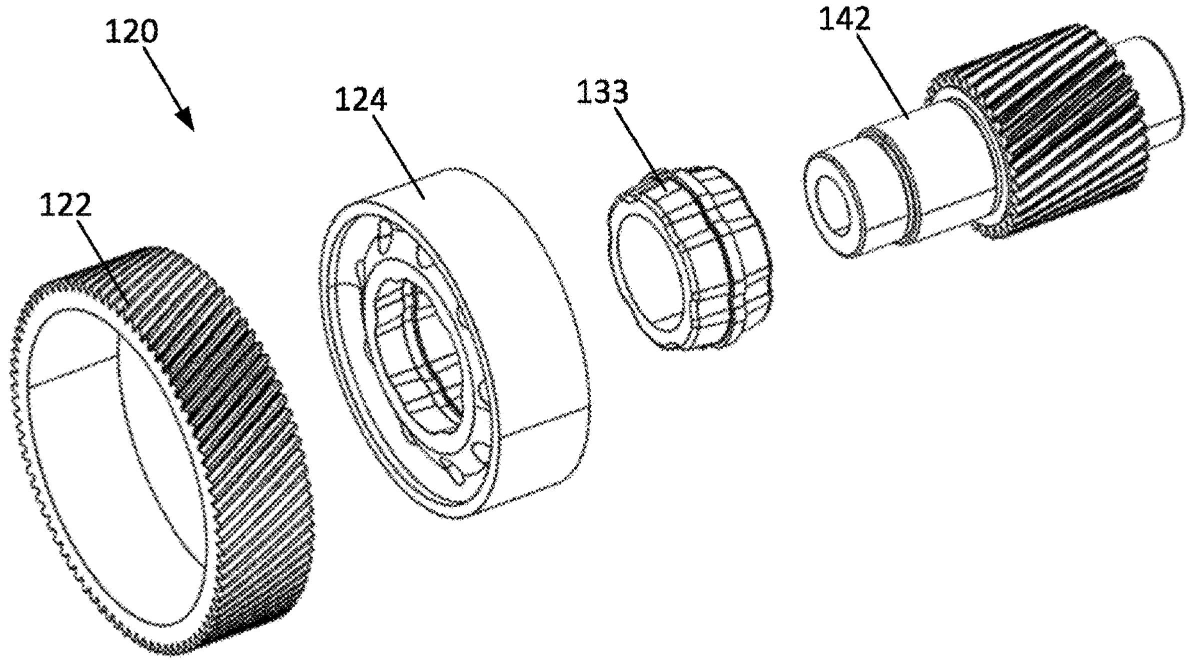
FIG. 12 is an exploded view of a multi-metal gear assembly, according to various examples of the present disclosure.

FIG. 8 is a perspective view of a multi-metal gear assembly, according to various examples of the present disclosure. FIG. 9 is a cross-section view of the multi-metal gear assembly of FIG. 8, according to various examples of the present disclosure. FIG. 10 is a side view of the multi-metal gear assembly of FIG. 8, according to various examples of the present disclosure. FIG. 11 is a cross-section of a side of the multi-metal gear assembly of FIG. 8, according to various examples of the present disclosure. FIG. 12 is an exploded view of a multi-metal gear assembly, according to various examples of the present disclosure. The overall shape and material composition are similar to those described above for FIGS. 1-4. In the illustrated example of FIG. 4, a web or core 124 does not include a monolithic hub portion, but has instead a separate hub 133 residing within the middle portion 134. In various examples, the middle portion 134 includes a plurality of holes 138 formed therein. In other examples, a solid middle portion 34 that does not include holes, such as holes 38, may be utilized depending on various applications. In FIGS. 8-12, a shaft 142 may be mounted to a gear assembly 120, in various examples. FIG. 8 illustrates the web 124 that may be formed of a material other than the material of a ring gear 122. For example, the web 124 may include a one-piece shape that has a monolithic hub portion 133 formed thereon, and the web 124 may extend from the hub portion 133 radially to the ring gear 122. In various examples, the web 124 includes a plurality of holes 138 formed therein.

Figure 13:
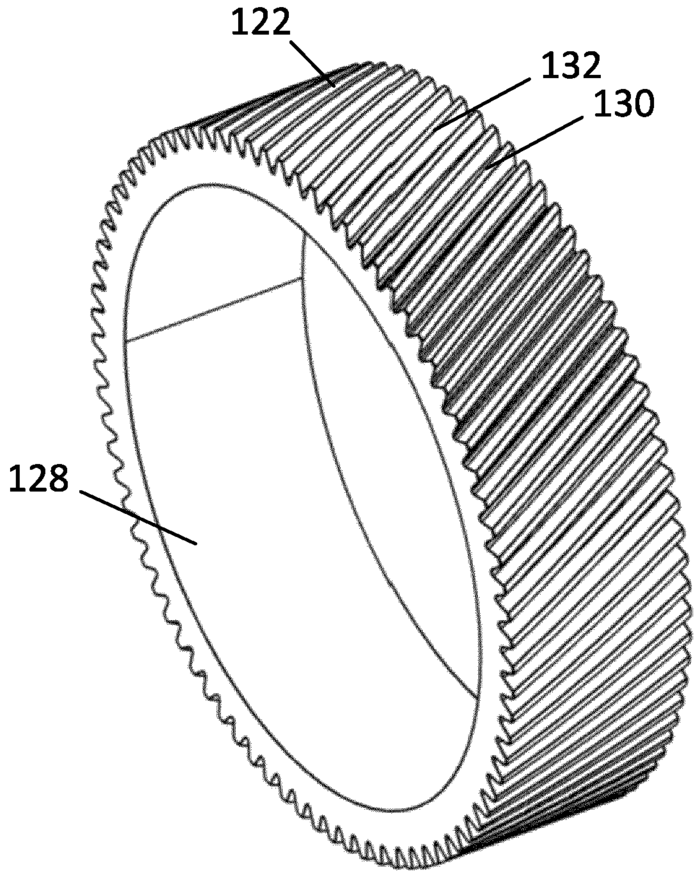
FIG. 13 is a perspective view of a hub of a multi-metal gear assembly, according to various examples of the present disclosure.

FIG. 13 is a perspective view of a hub of a multi-metal gear assembly, according to various examples of the present disclosure. FIG. 13 illustrates a ring gear 122 similar to that illustrated in FIG. 4, the ring gear 122 including an inner diameter 128 separated from an outer diameter 130. For example, the outer diameter 130 includes gear teeth 132 formed thereon. In the example shown, the gear teeth 132 are helical. Other types of gear teeth arrangements are possible. For example, the gear teeth 132 can be configured to define a spur gear (i.e., straight teeth parallel to axis of rotation), a bevel gear, a miter gear, and other types of gears. In the depicted embodiments, the inner diameter 128 is smooth. For example, although the hub illustrated in FIG. 13 appears similar to the hub illustrated in FIG. 6, the pitch and thickness of the helical gears 132 are different from the pitch and thickness of the helical gears 32 illustrated in FIG. 6.

Figure 14:
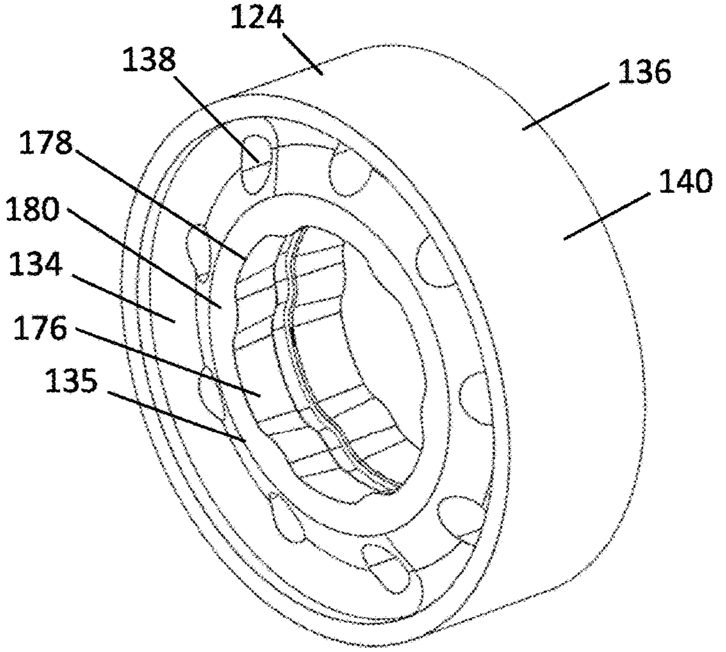
FIG. 14 is a perspective view of a web or core of a multi-metal gear assembly, according to various examples of the present disclosure.
Figure 15:
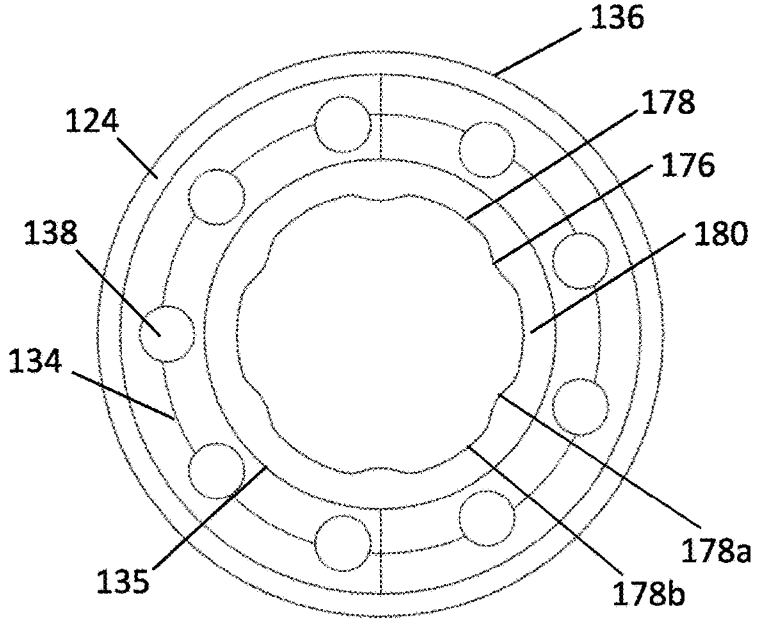
FIG. 15 is a perspective view of a web or core of a multi-metal gear assembly, according to various examples of the present disclosure.
Figure 16:
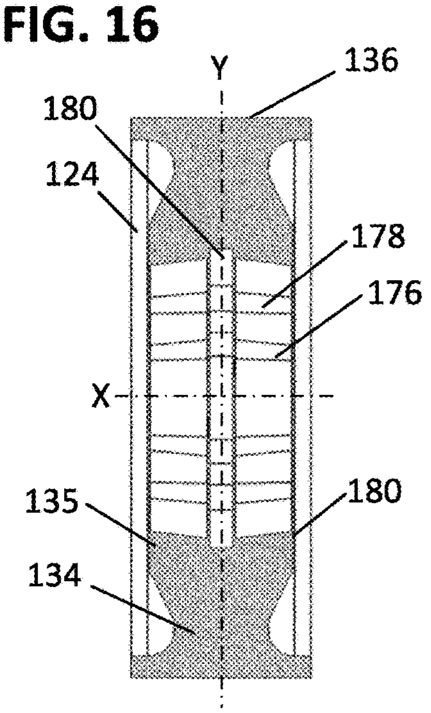
FIG. 16 is a side cross-section of a web of a multi-metal gear assembly, according to various examples of the present disclosure.

FIG. 14 is a perspective view of a web of a multi-metal gear assembly, according to various examples of the present disclosure. FIG. 15 is a side view of a web of a multi-metal gear assembly, according to various examples of the present disclosure. FIG. 16 is a side cross-section of a web of a multi-metal gear assembly, according to various examples of the present disclosure. FIGS. 14-16 illustrate the web 124 that is formed of a material other than the material of the ring gear 122 illustrated in FIG. 13. In various examples, the core 124 extends from an inner diameter portion 135 radially to a middle portion 134 that connects the inner diameter portion 135 and an outer portion 136. In the illustrated example, a middle portion 134 includes a plurality of holes 138 formed therein. In other examples, a solid middle portion 134 without holes, such as holes 138, may be utilized depending on various applications. The outer portion 136 includes a mating surface 140 that is configured to be coupled to the inner diameter 128 of the ring gear 122.

Figure 17:
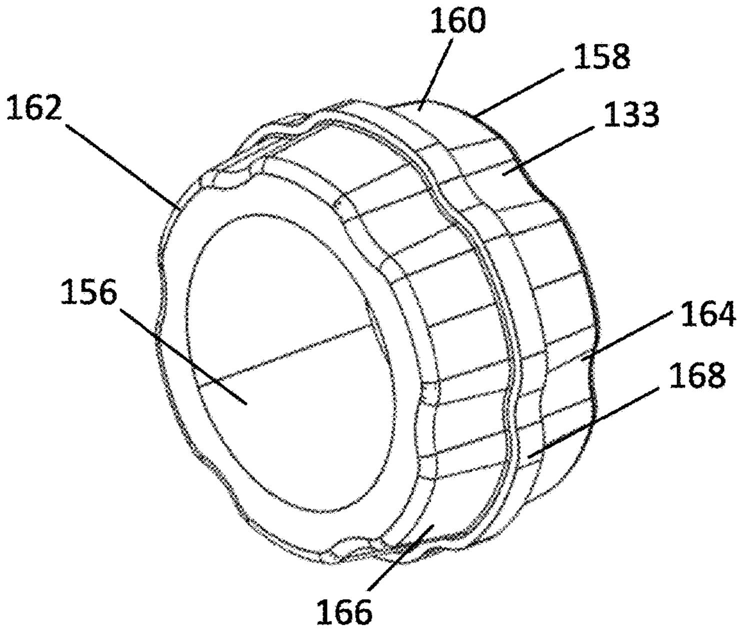
FIG. 17 is a perspective view of a hub of a multi-metal gear assembly, according to various examples of the present disclosure.
Figure 18:
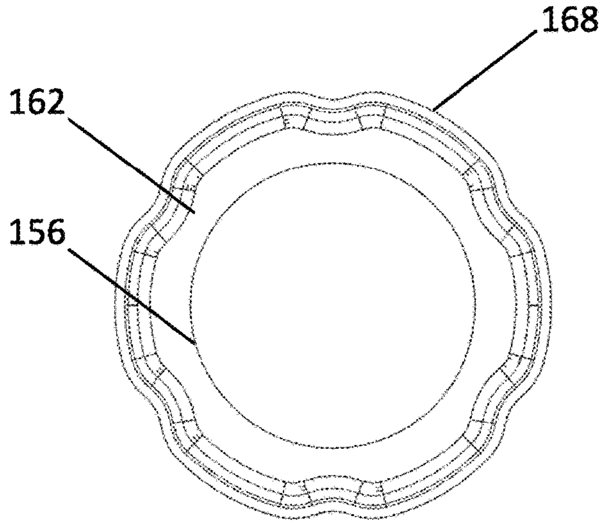
FIG. 18 is a side view of a hub of a multi-metal gear assembly, according to various examples of the present disclosure.
Figure 19:
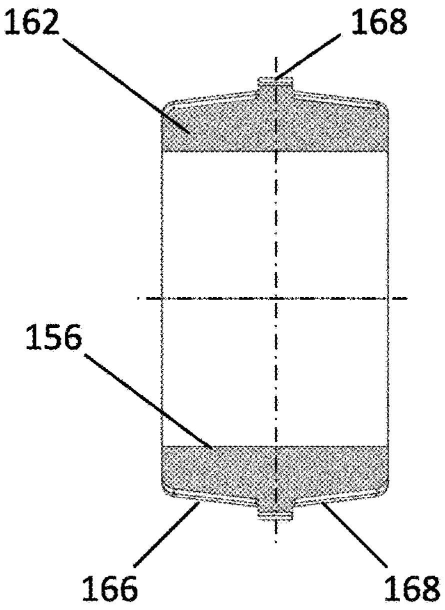
FIG. 19 is a side cross-section of a hub of a multi-metal gear assembly, according to various examples of the present disclosure.

FIG. 17 is a perspective view of a hub of a multi-metal gear assembly, according to various examples of the present disclosure. FIG. 18 is a side view of a hub of a multi-metal gear assembly, according to various examples of the present disclosure. FIG. 19 is a side cross-section of a hub of a multi-metal gear assembly, according to various examples of the present disclosure. FIGS. 17-19 illustrate the hub 133, which may be formed of or include stainless steel, or low alloy steel such as, e.g., 1045 steel, 20MnCr5, or 8620 steel, which is a low carbon nickel chromium molybdenum alloy steel. In various examples, the hub 133 includes an inner diameter 156 separated from an outer diameter 158. In an example, the outer diameter 158 includes a predefined shape. In various examples, the predefined shape includes a series 160 of alternating raised portions 162 coupled to each other by a sunken radius 164. In further examples, the series 160 may be formed about a circumference 166 of the hub 133. In various examples, the series 160 may define a rotational coupling feature for the hub 133 relative to the core 124. The outer diameter 158 of the hub 133 includes a raised locking portion 168 formed about the circumference 166 of the hub 133. For example, the raised locking portion 168 may be formed about a middle of the circumference 166 of the hub 133. In one example, the hub 133 may be forged or sintered to include the series 160 and locking portion 168 without a separate machining operation.

Referring back to FIG. 14, the core 124 links the hub 133 to the ring gear 122. In one aspect, the core 124 is formed of a lighter material relative to the hub 133 and ring gear 122. The core 124 includes an inner portion 176 that includes complimentary shapes 178, in the form of alternating lobes 178*a* and recesses 178*b*, that form due to the series 160, and complimentary shapes 180 that form due to the locking portion 168 of the hub 133. In various examples, the complimentary shapes 178, 180 lock to the hub 133 and maintain a connection between the hub 133 and the core 124 in both a rotational and thrust direction. In some examples, the hub 133 is formed in a first molding or casting operation, and the core is over-molded onto the hub in a second molding or casting operation. In some examples, the ring gear 122 is press-fit onto the core 124 after the core has been over-molded onto the hub 133.

Figure 20:
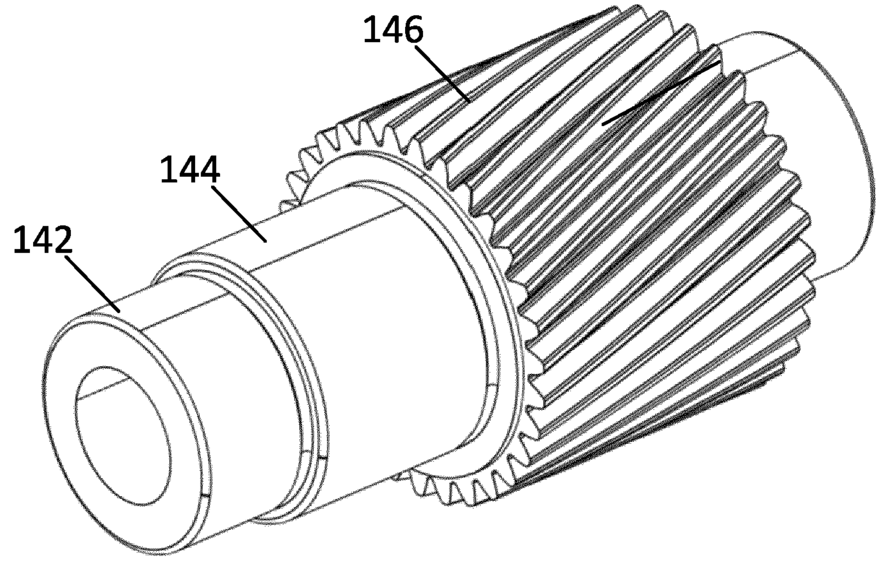
FIG. 20 is a perspective view of a shaft and gear, according to various examples of the present disclosure.
Figure 21:
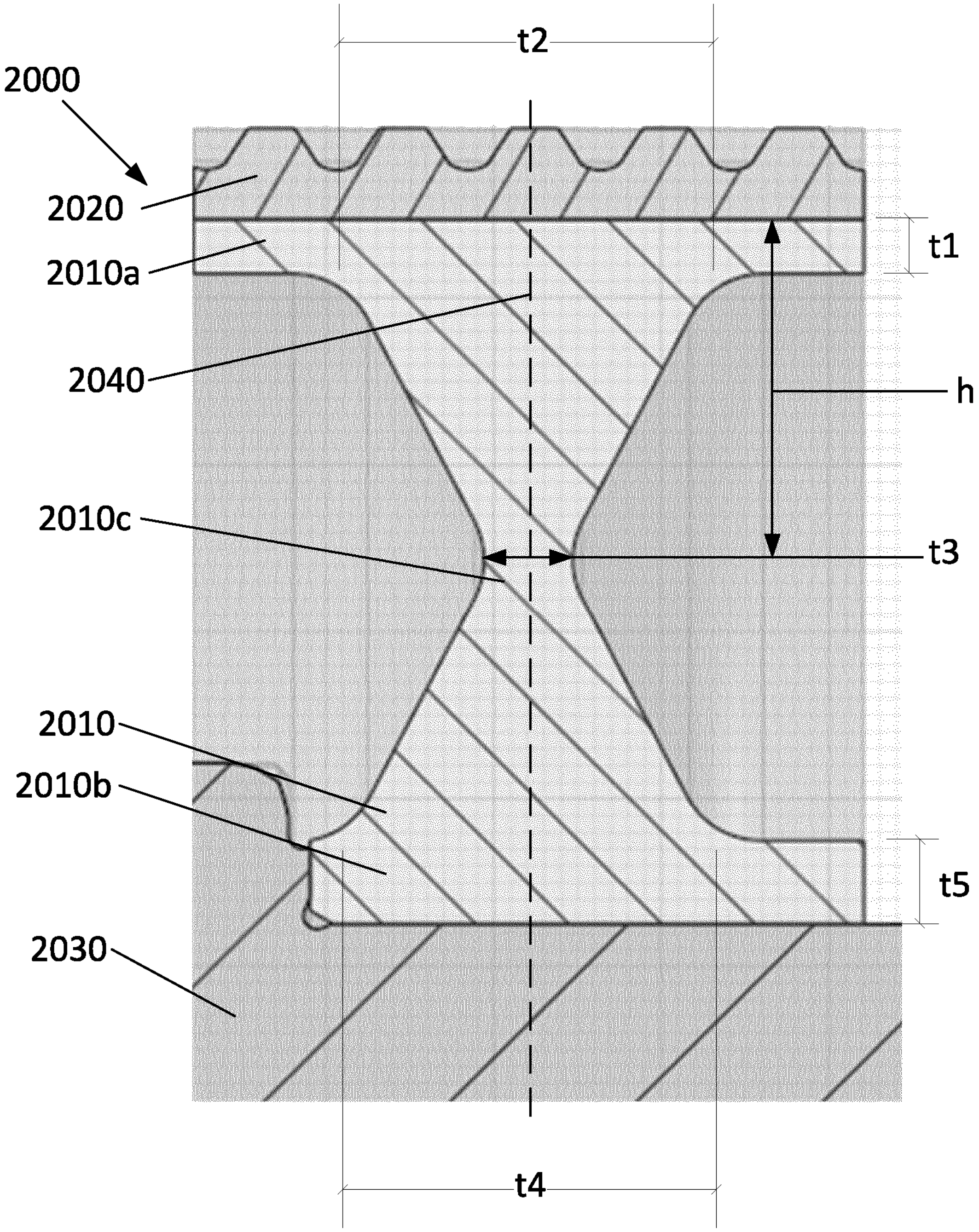
FIG. 21 is a cross-section view of a core assembly, according to various examples of the present disclosure.

FIG. 21 is a cross-section view of a core assembly, according to various examples of the present disclosure. In FIG. 20, a core assembly 2000 includes a core 2010 coupled to a ring gear 2020 on an outside portion thereof, and a hub 2030 on an inside portion thereof. The core 2010 and the aspects discussed in relation to FIG. 20, may be applied to the previously described examples shown at FIGS. 1-7 and 8-19. In various examples, the cross-section of the core 2010 has a generally "X" shape, with a fillet radius "r" at a center of the cross-section of the core 2010 in a range of 2-8 mm, or equal to about 5 mm. In an example, the outer ring gear 2020 may be made of or include, e.g., forged steel. In another example, the core 2010 may be made of or include cast iron. In various examples, the cross-section of the core 2010 may be described via a plurality of metrics such as, e.g., the thickness t1 of the upper portion 2010*a* of the core 2010, the width t2 of the upper portion of the cross-section of the core 2010, the height "h" of the upper limit of the outer portion of the core 2010 to the center thereof, width t3 of the cross-section of the central portion 2010*c* of core 2010 at a narrowest point thereof, the fillet radius "r" of the narrowest portion of the cross-section of the core 2010, the width t4 of the lower portion of the cross-section of the core 2010, and the thickness t5 of the lower portion 2010*b* of the core 2010. In another example, the cross-section 2010 is symmetrical with respect to a line 2040 that is perpendicular to surfaces of the planar upper and lower portions of the core 2010 and that passes through a center of the width t3 of the cross-section of the central portion 2010*c* of core 2010. Asymmetrical arrangements are possible. In the example shown, t2 is slightly greater than t4. However, other arrangements are possible, such as t2 and t4 being equal or t4 being greater than t2.

With reference to the dimension variables shown in FIG. 20, certain ranges and parameters can be established due to manufacturing and space availability. For example, manufacturing limitations may define a lower limit for width t2, t3, t4, and height "h" while space availability may define an upper limit for width t2, t3, t4, and height "h". In some examples, the width t2 of the upper portion 2010*a* of the cross-section of the core 2010, can have a size in a range of 5.3-19.05 mm. The width t3 of the cross-section of the central portion 2010*c* of core 2010 at a narrowest point thereof may be in a range of 5.3-19.05 mm. The width t4 of the lower portion of the cross-section of the core 2010 may have a size in a range of 5.3-19.05 mm. In an example, the height "h" of the upper limit of the outer portion of the core 2010 to the center thereof is in a range of 5-30 mm. In other examples, the surface roughness may be in a range of 20-25 mm, and the material strength factor may be in a range of 0.9-1.1 mm. In some examples, the above-cited range for the surface roughness Ra is defined by manufacturing process parameters. In some examples, the above-cited range for the strength factor K2 is based on the variation in material properties.

In other examples, as the above parameters are described within given range, other parameters may have shorter ranges. For example, the thickness t1 of the upper portion 2010*a* of the core 2010 may be equal to about 3.5 mm. In some applications, t1 is provided at a minimum dimension required to enable a press fit installation without damaging the thickness t1. In another example, the thickness t5 of the lower portion 2010*b* of the core 2010 may be equal to about 7.5 mm. In yet another example, the fillet radius "r" of the narrowest portion of the cross-section of the core 2010 may be equal to about 5 mm. As the radius "r" is not a high contributor to weight, a maximum value can be used.

Although the cross-sectional shape of the core 2010 is illustrated in FIG. 21 as being that of an "X" or "X-section" in which t2 and t4 are both greater than t3, the cross-sectional shape of the core 2010 may have other shapes as illustrated. For example, FIGS. 4 and 5 show configurations that narrows in a radially outward direction, wherein t4 is greater than t3, and wherein t3 is greater than t2. Other shapes are possible. For example, a non-tapered configuration (i.e., "I-section") in which t2, t3, and t4 are equal to each other. For example, a configuration that narrows in a radially inward direction, wherein t2 is greater than t3, and wherein t3 is greater than t4. In some examples, the core is tapered from the midpoint in a radially outward direction or in a radially inward direction. For example, a configuration can include t3 and t4 being equal, with t2 being greater than t3 and t4 (i.e., "Y-section"). For example, a configuration can include t2 and t3 being equal, with t4 being greater than t2 and t3 (i.e., "Inverted Y-section").

Although various examples and examples are described herein, those of ordinary skill in the art will understand that many modifications may be made thereto within the scope of the present disclosure. Accordingly, it is not intended that the scope of the disclosure in any way be limited by the examples provided.

What is claimed is:

1. A multi-material gear assembly comprising:

a ring gear comprising a first material, the ring gear having an inner diameter and an outer diameter defining a plurality of gear teeth;

a core coupled to the inner diameter of the ring gear, the core comprising a second material that is different from the first material; and a hub coupled to the core, the hub comprising a third material different from the second material, wherein the core surrounds the hub, wherein an outer circumference of the hub has a predefined shape;

wherein the predefined shape comprises a plurality of alternating raised portions; and any two raised portions are coupled to each other via a sunken radius, wherein the hub includes a raised locking portion around a middle of the outer circumference of the hub and wherein the core includes a complimentary shape to the raised locking portion to connect the hub and core, wherein inner diameter portions of the core taper radially inward to said complimentary shape;

wherein a cross-section of the core comprises an upper planar portion, a lower planar portion, and a central portion, and is tapered from the upper planar portion and the lower planar portion towards the central portion.

2. The multi-material gear assembly of claim 1, wherein at least one of the first material and the third material comprises stainless steel and wherein the second material comprises one of cast iron and an aluminum composite material.

3. The multi-material gear assembly of claim 2, wherein the aluminum composite material comprises Al 6061-SiC.

4. The multi-material gear assembly of claim 1, wherein the outer diameter of the ring gear comprises a plurality of helical gear teeth.

5. The multi-material gear assembly of claim 4, wherein the inner diameter of the ring gear has a smooth surface compared to the outer diameter.

6. The multi-material gear assembly of claim 1, wherein the core comprises a middle portion around the hub, and an outer portion around the middle portion.

7. The multi-material gear assembly of claim 6, wherein the hub is one of press-fit into the core and overmolded with the core.

8. The multi-material gear assembly of claim 6, wherein the hub is detachable from the middle portion of the core.

9. The multi-material gear assembly of claim 6, wherein the outer portion of the core comprises a mating surface configured to be coupled to the inner diameter of the ring gear.

10. The multi-material gear assembly of claim 1, wherein the cross-section of the core has an angled cross shape.

11. The multi-material gear assembly of claim 1, wherein a thickness of the upper planar portion is equal to about 3.5 mm.

12. The multi-material gear assembly of claim 1, wherein a width of at least one of the upper planar portion and the lower planar portion is in a range of about 5.3-19.05 mm.

13. The multi-material gear assembly of claim 1, wherein a width of the central portion is in a range of about 5.3-19.05 mm.

14. The multi-material gear assembly of claim 1, wherein a thickness of the lower planar portion is equal to about 7.5 mm.

15. The multi-material gear assembly of claim 1, wherein a fillet radius of the central portion of the core is equal to about 5 mm.

16. The multi-material gear assembly of claim 1, wherein a surface roughness of one of the upper planar portion and the lower planar portion is in a range of about 20-25 mm.

* * * * *